US012736128B2

(12) United States Patent
Kim et al.

(10) Patent No.: US 12,736,128 B2
(45) Date of Patent: Sep. 15, 2026

(54) LUBRICANT SUPPLY SYSTEM

(71) Applicant: HYUNDAI MOBIS CO., LTD., Seoul (KR)

(72) Inventors: Dae Wook Kim, Yongin-si (KR); Sang Woo Kim, Yongin-si (KR); Nam Seok Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 19/196,273

(22) Filed: May 1, 2025

(65) Prior Publication Data

US 2026/0016084 A1 Jan. 15, 2026

(30) Foreign Application Priority Data

Jul. 10, 2024 (KR) ........................ 10-2024-0091069

(51) Int. Cl.

*F16H 57/04* (2010.01)
*F16C 33/66* (2006.01)
*H02K 5/173* (2006.01)
*H02K 9/193* (2006.01)

(52) U.S. Cl.

CPC ..... *F16H 57/0486* (2013.01); *F16C 33/6659* (2013.01); *F16H 57/0423* (2013.01); *F16H 57/0427* (2013.01); *F16H 57/0436* (2013.01); *F16H 57/045* (2013.01);

(Continued)

(58) Field of Classification Search

CPC ............. F16H 57/0486; F16H 57/0423; F16H 57/0427; F16H 57/0436; F16H 57/045; F16H 57/046; F16H 2057/085; F16H 57/082; F16C 33/6659; H02K 5/173; H02K 9/193; F16N 7/36; F16N 13/22; F16N 2210/18

See application file for complete search history.

(56) References Cited

U.S. PATENT DOCUMENTS 3,583,526 A * 6/1971 Mulleder ............ F16H 57/0427 184/6
4,429,587 A * 2/1984 Finn, III ............. F16H 57/0447 184/6.12

(Continued)

FOREIGN PATENT DOCUMENTS

KR 10-2024-0087229 A 6/2024

*Primary Examiner* — Henry Y Liu

(74) *Attorney, Agent, or Firm* — Morgan, Lewis & Bockius LLP

(57) ABSTRACT

The present disclosure relates to a lubricant supply system, and more specifically, to a lubricant supply system applied to a motor for a vehicle. The lubricant supply system of the present disclosure includes a carrier that fixes the carrier bearing adjacent to the needle bearing to the motor housing, secures the flow path along which lubricant is supplied to one surface of the carrier, and includes the oil guide that stores the supplied lubricant during high-speed rotation and supplies the lubricant to other parts during low-speed rotation, thereby minimizing forced lubrication compared to conventional lubricant supply systems and smoothly supplying oil to the needle bearing and the carrier bearing even during high-speed rotation using a centrifugal force and wind power generated naturally from the on-axis rotors.

12 Claims, 7 Drawing Sheets

(52) U.S. Cl.
CPC .......... *F16H 57/046* (2013.01); *H02K 5/173* (2013.01); *H02K 9/193* (2013.01)

(56) References Cited

U.S. PATENT DOCUMENTS 5,637,048 A * 6/1997 Maeda .................. H02K 7/116 475/150
7,713,159 B2 * 5/2010 Hirota ................... B60K 17/20 475/249
8,556,760 B2 * 10/2013 Mack ................. B60L 15/2054 475/152
8,657,073 B2 * 2/2014 Matsumoto ......... F16H 57/0483 184/6.12
8,905,885 B2 * 12/2014 Yamamoto ............ B60K 6/365 184/6.12
8,932,170 B2 * 1/2015 Ishizuka ............ F16H 57/0427 475/159
9,328,817 B2 * 5/2016 Yamashita .......... F16H 57/0423
9,387,722 B2 * 7/2016 Fukudome .......... B60B 27/0005
10,378,629 B2 * 8/2019 Hiyoshi ............. F16H 37/0813
10,480,639 B2 * 11/2019 Pydin .................... F16H 57/043
10,801,602 B2 * 10/2020 Peng ....................... B60K 1/00
10,823,174 B2 * 11/2020 Violet .................. F04D 25/028
11,034,237 B2 * 6/2021 Hirao ...................... F16H 63/30
11,241,947 B2 * 2/2022 Suyama .................. B60K 1/00
11,428,318 B2 * 8/2022 Ooki ..................... F16H 37/082
11,664,707 B2 * 5/2023 Takahashi ................ H02K 5/18 310/64
11,664,708 B2 * 5/2023 Takahashi ............. H02K 21/24 310/64
11,746,883 B2 * 9/2023 Yasui .................. F16H 57/0423 74/606 R
11,746,884 B2 * 9/2023 Suzuki ................ F16H 57/0423 475/150
11,746,885 B2 * 9/2023 Kagami ................... B60K 1/00 475/160
11,761,534 B2 * 9/2023 Yasui .................. F16H 57/0483 475/149
11,767,909 B2 * 9/2023 Yasui .................. F16H 57/0476 475/150
11,796,041 B2 * 10/2023 Yoshioka .............. F16H 37/042
11,821,513 B2 * 11/2023 Oshidari ............. F16H 63/3425
11,824,428 B2 * 11/2023 Takahashi ................ H02K 5/18
11,831,228 B2 * 11/2023 Takahashi ............ H02K 21/044
11,850,938 B2 * 12/2023 Jeong .................. F16H 57/0426
11,859,707 B2 * 1/2024 Suzuki ...................... F16H 1/28
11,962,228 B2 * 4/2024 Takahashi ................ H02K 5/18
11,984,795 B2 * 5/2024 Takahashi ................ H02K 3/02
12,214,894 B1 * 2/2025 Graves ................ F16H 57/0476
12,227,300 B2 * 2/2025 Graves ................... B64D 27/24
12,276,334 B2 * 4/2025 Kosaka .................. H02K 7/116
12,292,103 B2 * 5/2025 Reisch .................. F16H 57/043
12,391,395 B1 * 8/2025 Graves ................... B64D 27/33
12,392,406 B2 * 8/2025 Oota ................... F16H 57/0412
12,435,785 B2 * 10/2025 Montagna ........... F16C 33/6677
12,539,973 B2 * 2/2026 Graves ................... B64D 27/24
2007/0238567 A1 * 10/2007 Hirota ..................... F16H 48/22 475/160
2009/0186737 A1 * 7/2009 Matsumoto ......... F16H 57/0483 475/160
2013/0145880 A1 * 6/2013 Yamashita ............. E02F 9/126 74/467
2013/0192400 A1 * 8/2013 Dodo .................... F16H 37/082 74/421 A
2013/0283972 A1 * 10/2013 Yamamoto ............... B60K 6/22 903/902
2014/0148295 A1 * 5/2014 Ishizuka .............. B60K 17/046 475/159
2015/0328925 A1 * 11/2015 Fukudome .......... B60B 27/0073 301/6.5
2019/0063589 A1 * 2/2019 Pydin .................. F16H 57/0479
2019/0221348 A1 * 7/2019 Kelly ...................... H01F 7/081
2019/0301466 A1 * 10/2019 Violet ................. F16H 57/0436
2020/0173535 A1 * 6/2020 Peng ...................... B60K 17/16
2020/0247236 A1 * 8/2020 Hirao ................... B60K 17/046
2021/0293325 A1 * 9/2021 Tanaka ..................... B60K 1/00
2022/0024302 A1 * 1/2022 Jeong ................... B60K 7/0007
2023/0029562 A1 * 2/2023 Kagami .............. F16H 57/0486
2023/0038311 A1 * 2/2023 Yasui .................. F16H 57/0421
2023/0044400 A1 * 2/2023 Yasui .................... F16H 57/037
2023/0045442 A1 * 2/2023 Oshidari ................ B60K 17/16
2023/0050981 A1 * 2/2023 Suzuki ................ F16H 57/0423
2023/0051028 A1 * 2/2023 Yasui .................. F16H 57/0483
2023/0068579 A1 * 3/2023 Suzuki ...................... F16H 1/28
2023/0074168 A1 * 3/2023 Yasui .................. F16H 57/0476
2023/0258254 A1 * 8/2023 Yoshioka .............. F16H 37/042 475/83
2023/0400088 A1 * 12/2023 Mueller .................. F16H 37/12
2024/0159310 A1 * 5/2024 Montagna ............... F16C 33/48
2024/0247713 A1 * 7/2024 Kosaka ............... F16H 57/0423
2024/0270393 A1 * 8/2024 Graves ................... B64D 27/24
2024/0270394 A1 * 8/2024 Graves ................... B64D 27/24
2024/0271691 A1 * 8/2024 Oota ..................... F16H 57/037
2024/0376971 A1 * 11/2024 Reisch ................ F16H 57/0415
2025/0237296 A1 * 7/2025 Reisch ................ F16H 57/0471

* cited by examiner

LUBRICANT SUPPLY SYSTEM

CROSS REFERENCE TO RELATED APPLICATION

The present application claims priority to Korean Patent Application No. 10-2024-0091069, filed Jul. 10, 2024, the entire contents of which is incorporated herein for all purposes by this reference.

BACKGROUND OF THE DISCLOSURE

Field of the Disclosure

The present disclosure relates to a lubricant supply system, and more specifically, to a lubricant supply system applied to a motor for a vehicle.

Description of the Related Art

Unlike conventional off-axis rotors, a reducer of a motor with an on-axis rotor in which a drive shaft is inserted into the central portion of a rotor shaft cannot form an oil flow path at the central portion of the rotor, and thus needs to supply oil by only rotation (churning), and it is difficult to lubricate each bearing included in the reducer by only churning. Accordingly, the on-axis rotor needs to form a separate oil lubrication path in a different form from conventional ones to forcibly supply oil to components of the reducer and lubricate the components. Accordingly, there are problems that the required specifications of a pump supplying oil are higher and the size is larger.

More specifically, in the case of conventional churning methods, since lubricant stays at only an edge rather than internal parts of the motor and the reducer due to a centrifugal force and wind power caused by a rapidly rotating planet gear, there is a problem that the lubricant is not supplied to a bearing positioned at a central portion. In addition, even when a flow path for forcibly supplying lubricant is formed in the rotor of the motor, there is a problem in that the lubricant is only supplied to some parts and the oil is not supplied to a needle bearing disposed therein.

DOCUMENT OF RELATED ART

[Patent Document 1] Korean Laid-Open Patent No. 10-2024-0087229 tilted "reducer for electric vehicle" published on Dec. 12, 2022

SUMMARY OF THE DISCLOSURE

The present disclosure has been made in efforts to solve the above problems and is directed to providing a lubricant supply system which includes a carrier that fixes a carrier bearing adjacent to a needle bearing to a motor housing, secures a flow path along which lubricant is supplied to one surface of the carrier, and includes an oil guide that stores the supplied lubricant during high-speed rotation and supplies the lubricant to other parts during low-speed rotation, thereby minimizing forced lubrication compared to conventional lubricant supply systems and smoothly supplying oil to the needle bearing and the carrier bearing even during high-speed rotation using a centrifugal force and wind power generated naturally from an on-axis rotors.

To solve the above problems, a lubricant supply system mounted on a motor according to one embodiment of the present disclosure includes a carrier which has an insertion hole formed at a central portion thereof and in which a carrier bearing, which is one of parts of the motor, is inserted into the insertion hole, an oil flow path inserted into a housing of the motor, and an oil guide that is coupled to the carrier and guides a flow of lubricant, wherein the carrier has one surface facing the housing, and the oil flow path has an outlet disposed to face the one surface of the carrier so that lubricant is sprayed onto the oil guide coupled to the carrier.

In addition, the oil flow path includes a main flow path connected to a pump that supplies lubricant and formed to extend in a radial direction of the motor, and a forced lubrication reduction flow path formed to extend from the main flow path toward the one surface of the carrier.

In addition, the oil guide is coupled to the one surface of the carrier, and is coupled at a position at which lubricant is received from the forced lubricant reduction flow path.

In addition, the oil guide includes a fixed part which is inserted into and coupled to the carrier and in which a hole-in guide flow path along which lubricant flows is perforated at a central portion thereof, and an oil collection part that is formed to extend from the fixed part and collects lubricant when the motor rotates.

In addition, the guide flow path includes an inclined surface, which is not parallel to an axial direction and radial direction of the motor, at an end portion of the oil collection part side.

In addition, the carrier is coupled to a pin in which an oil storage flow path in which lubricant is stored is formed to extend in an axial direction of the motor, and the oil guide has the fixed part inserted into the oil storage flow path of the pin.

In addition, the oil guide is formed integrally with the pin.

In addition, the pin includes an open groove that is open with a larger cross-sectional area than the oil storage flow path, is formed at one end to which the oil guide is coupled, and communicates with the oil storage flow path.

In addition, the oil collection part includes first extension that has one end connected to an end of the fixed part and formed to extend in a radial direction of the motor to come into contact with the one surface of the carrier, a second extension formed to extend from the first extension in the axial direction of the motor, and a third extension formed to extend from the second extension and formed to extend so that an end is positioned in a region in which the guide flow path is formed.

In addition, the third extension is formed to extend obliquely so as not to be parallel to the axial direction and radial direction of the motor.

In addition, the oil collection part includes a fourth extension that has one end connected to an end of the fixed part and formed to extend flatly in a radial direction of the motor to come into contact with the one surface of the carrier, and a fifth extension formed to extend from the fourth extension and formed to extend so that an end is positioned in a region in which the guide flow path is formed.

In addition, the fifth extension is formed to extend obliquely so as not to be parallel to the axial direction and radial direction of the motor.

DETAILED DESCRIPTION OF THE DISCLOSURE

Hereinafter, the technical spirit of the present disclosure will be described in more detail with reference to the accompanying drawings. Prior to this, terms or words used in this specification and claims should not be interpreted as limited to their usual or dictionary meanings and should be interpreted as meanings and concepts that conform to the technical idea of the present disclosure based on the principle that the inventor can appropriately define the concepts of the terms in order to describe his or her own disclosure in the best way.

Figure 1:
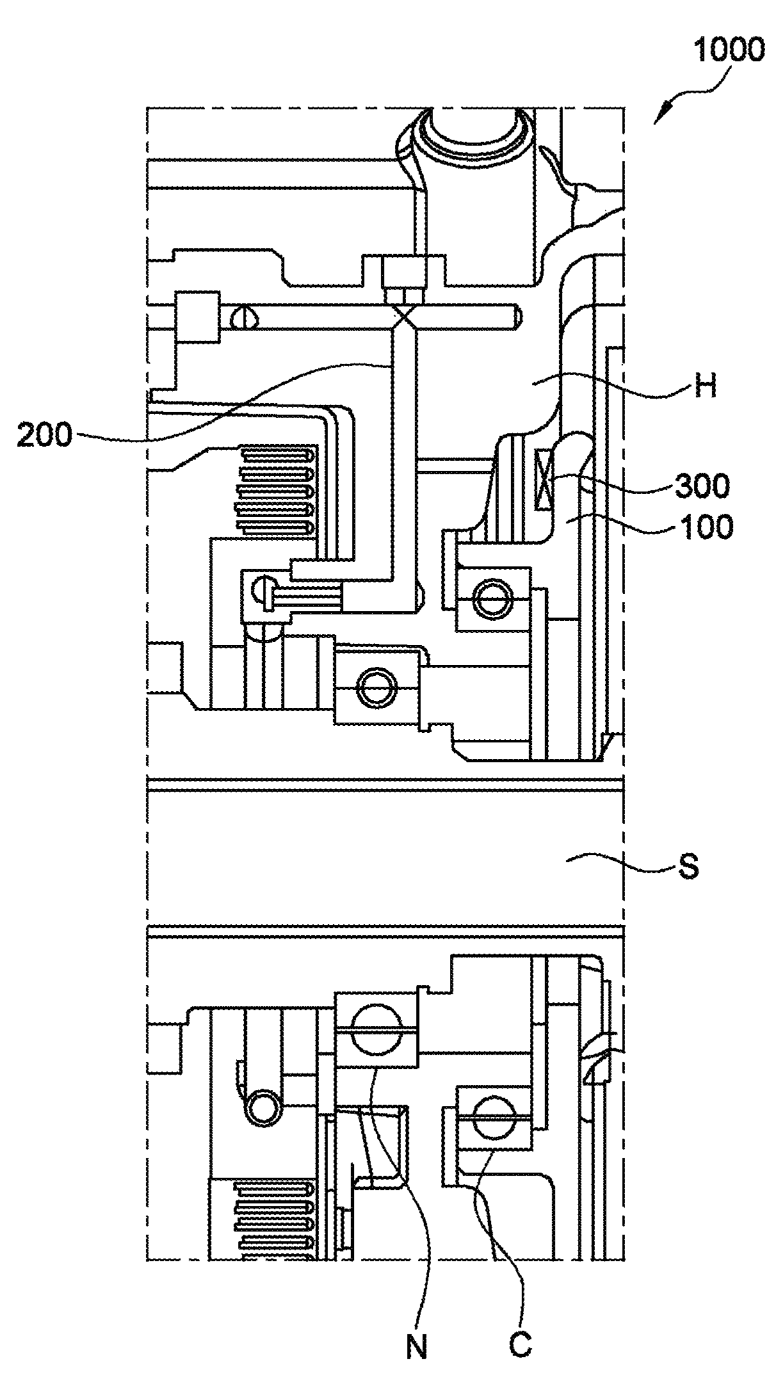
FIG. 1 is a partial cross-sectional view illustrating an internal structure of a motor to which a lubricant supply system of the present disclosure is applied.

Hereinafter, an internal structure of a motor to which a lubricant supply system 1000 of the present disclosure is applied will be briefly described with reference to FIG. 1.

The lubricant supply system 1000 of the present disclosure may be mounted on a motor to supply lubricant to parts of a reducer and may include a carrier 100 in which an insertion hole 120 is formed at a central portion and a carrier bearing C, which is one of the parts of the motor, is inserted into the insertion hole 120, and an oil flow path 200 inserted into a housing H of the motor. Lubricant may be supplied from a pump to the inside and outside of the housing H of the motor through the oil flow path 200, and the reducer of the motor may be forcibly lubricated through the oil flow path 200. The carrier 100 may have one surface facing the housing H of the motor, and the oil flow path 200 may have an outlet disposed to face one surface of the carrier 100 so that lubricant is sprayed to the one surface of the carrier 100.

In addition, the lubricant supply system 1000 of the present disclosure may include a guide that is coupled to the carrier 100 and disperses the lubricant. The oil guide 300 may store some lubricant using a centrifugal force when the motor rotates at a high speed and may disperse the lubricant to internal parts of the reducer and a number of bearings (such as a needle bearing N) positioned at a central portion of the motor using gravity when the motor rotates at a low speed.

In this way, by delivering some oil used for forced lubrication toward the carrier 100, storing the oil through the oil guide 300, and transferring the lubricant to the parts of the reducer, all parts may be lubricated even when they do not completely rely on the forced lubrication, and a flow volume required for the forced lubrication can be minimized. Furthermore, even when the required specifications of the oil pump are lower, each part of the reducer can be smoothly lubricated.

Hereinafter, the oil flow path 200 of the present disclosure will be described in more detail with reference to FIGS. 2 and 3.

Figure 2:
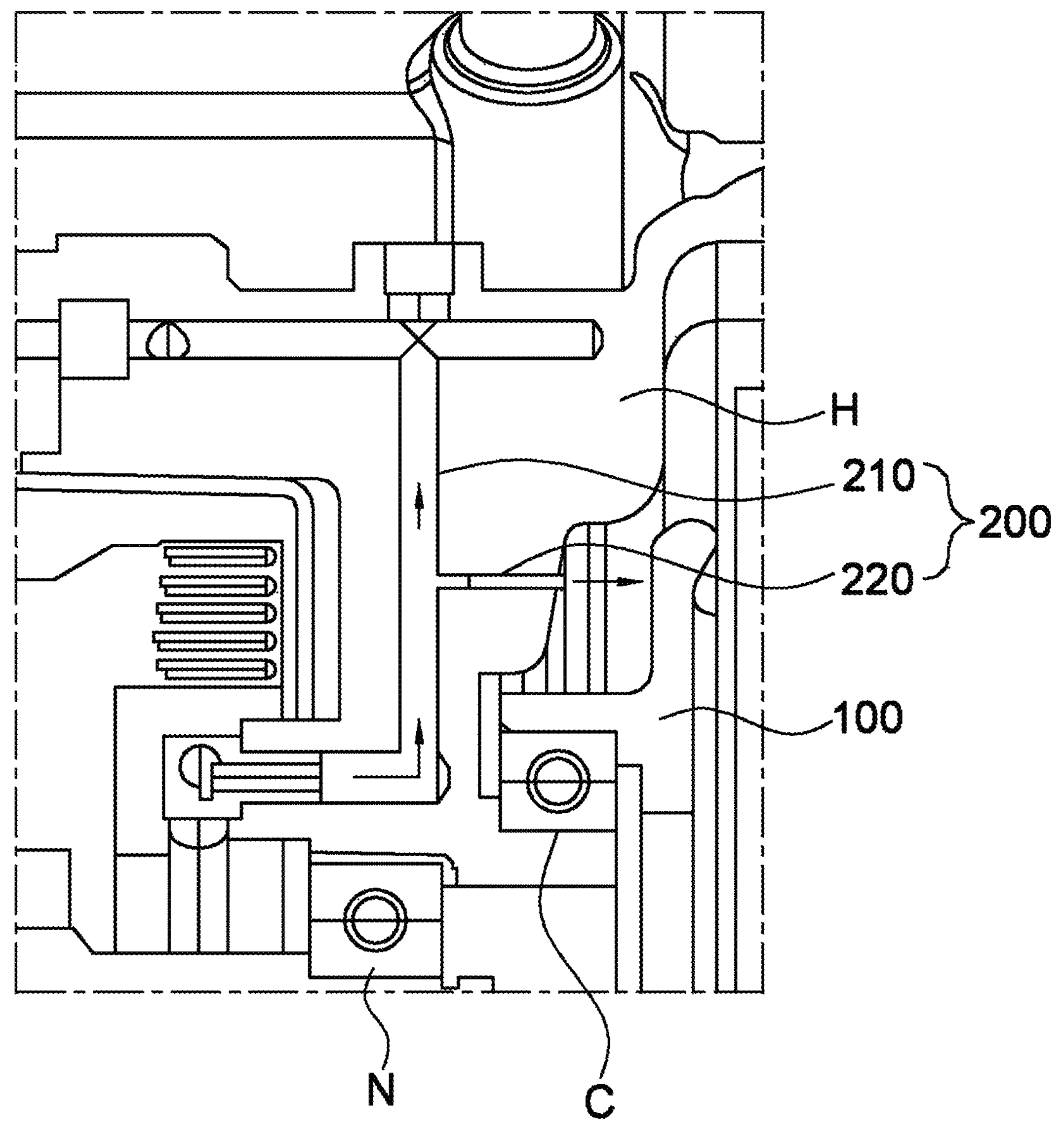
FIG. 2 is a partial cross-sectional view illustrating an oil supply flow path of the present disclosure.
Figure 3:
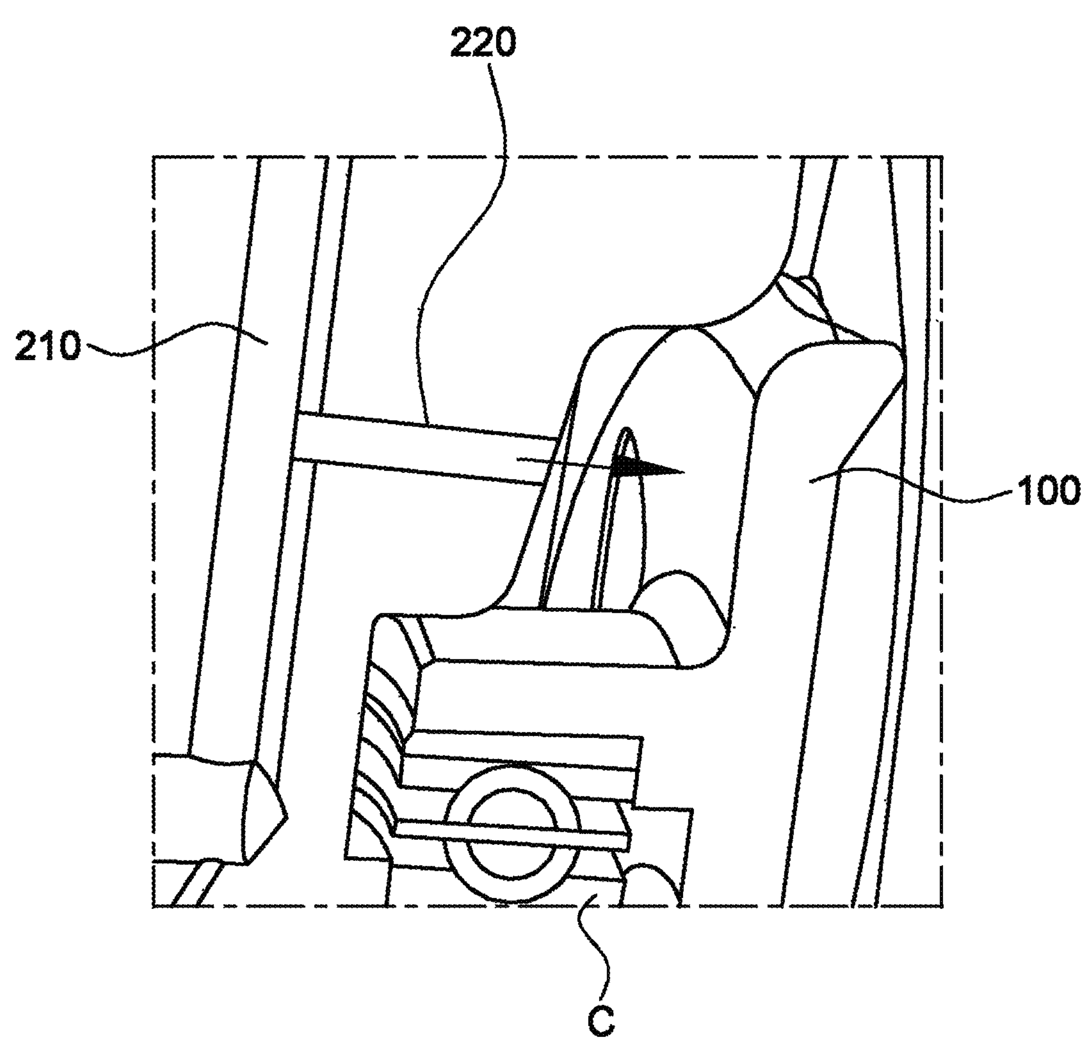
FIG. 3 is a partial perspective view illustrating the oil supply flow path of the present disclosure.

More specifically, as illustrated in FIGS. 2 and 3, the oil flow path 200 may include a main flow path 210 and a forced lubrication reduction flow path 220. More specifically, the main flow path 210 may be connected to the pump for supplying lubricant, formed to extend in a radial direction of the motor, and may have at least one outlet through which the lubricant is sprayed toward an edge of the motor. The lubricant may be forcibly injected through the main flow path 210 so that each part of the reducer may be forcibly lubricated.

In addition, the forced lubrication reduction flow path 220 may be formed to extend from the main flow path 210 toward one surface of the carrier 100. The forced lubrication reduction flow path 220 may be formed to communicate in a straight line, and an end, that is, an outlet, may be formed to face one surface of the carrier 100. By including the forced lubrication reduction flow path 220, a part of the lubricant may be transferred toward the carrier 100, and the lubricant may be more efficiently transferred to the parts disposed at the central portion by the carrier 100. Accordingly, even when the pump for supplying lubricant does not supply oil with a high flow volume, the lubricant may be transferred to all parts.

Hereinafter, the oil guide 300 of the present disclosure will be described in more detail with reference to FIGS. 4 to 7.

Figure 4:
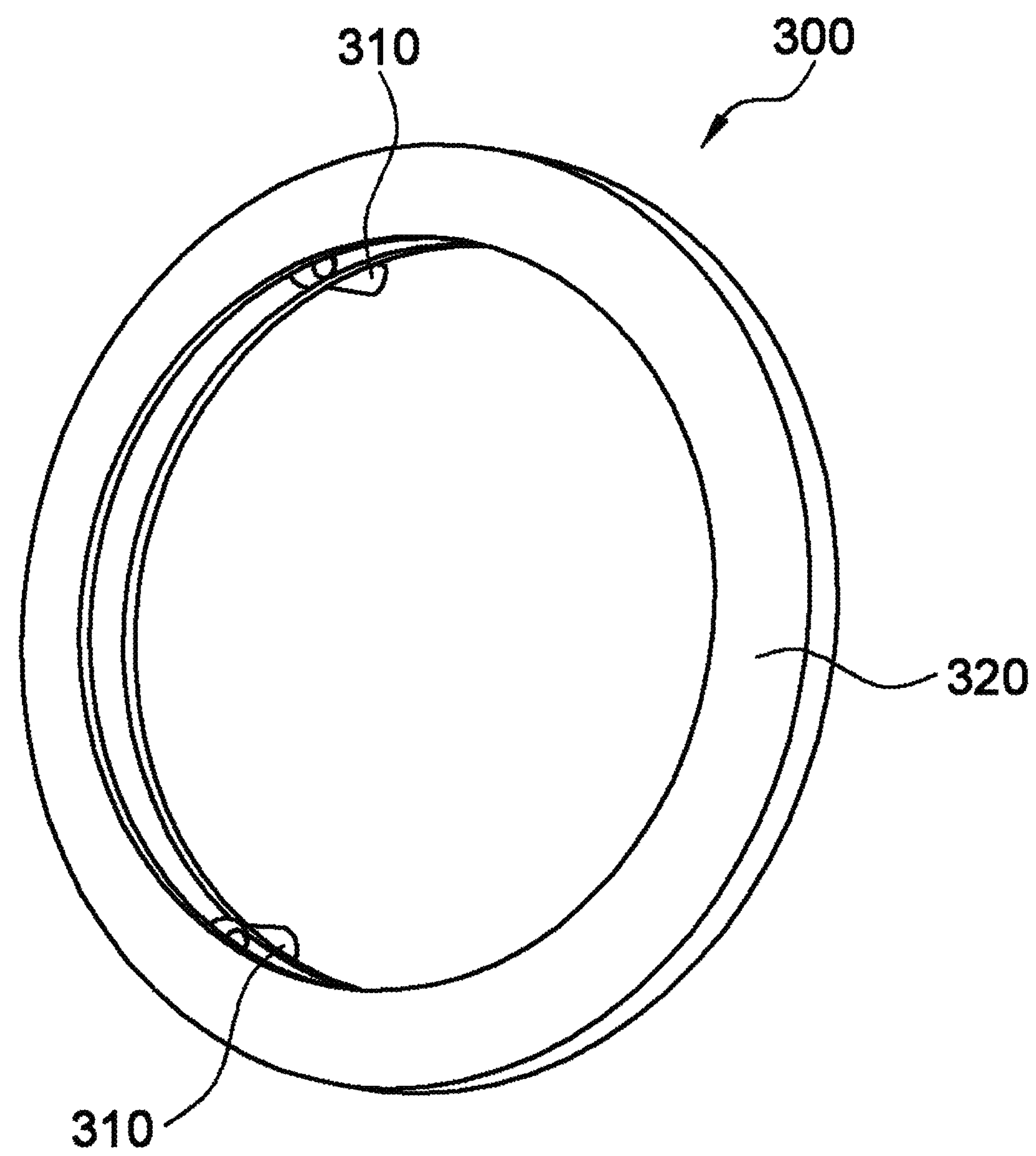
FIG. 4 is a perspective view illustrating an oil guide of the present disclosure.

As illustrated in FIG. 4, the oil guide 300 may include a fixed part 310 and an oil collection part 320. More specifically, the fixed part 310 may be inserted into and coupled to the carrier 100, a hole-in guide flow path 311 along which lubricant flows may be perforated at a central portion thereof, and the oil collection part 320 may be formed to extend from the fixed part 310 and formed in a "⊂" shape to store the lubricant when the motor rotates.

Figure 5:
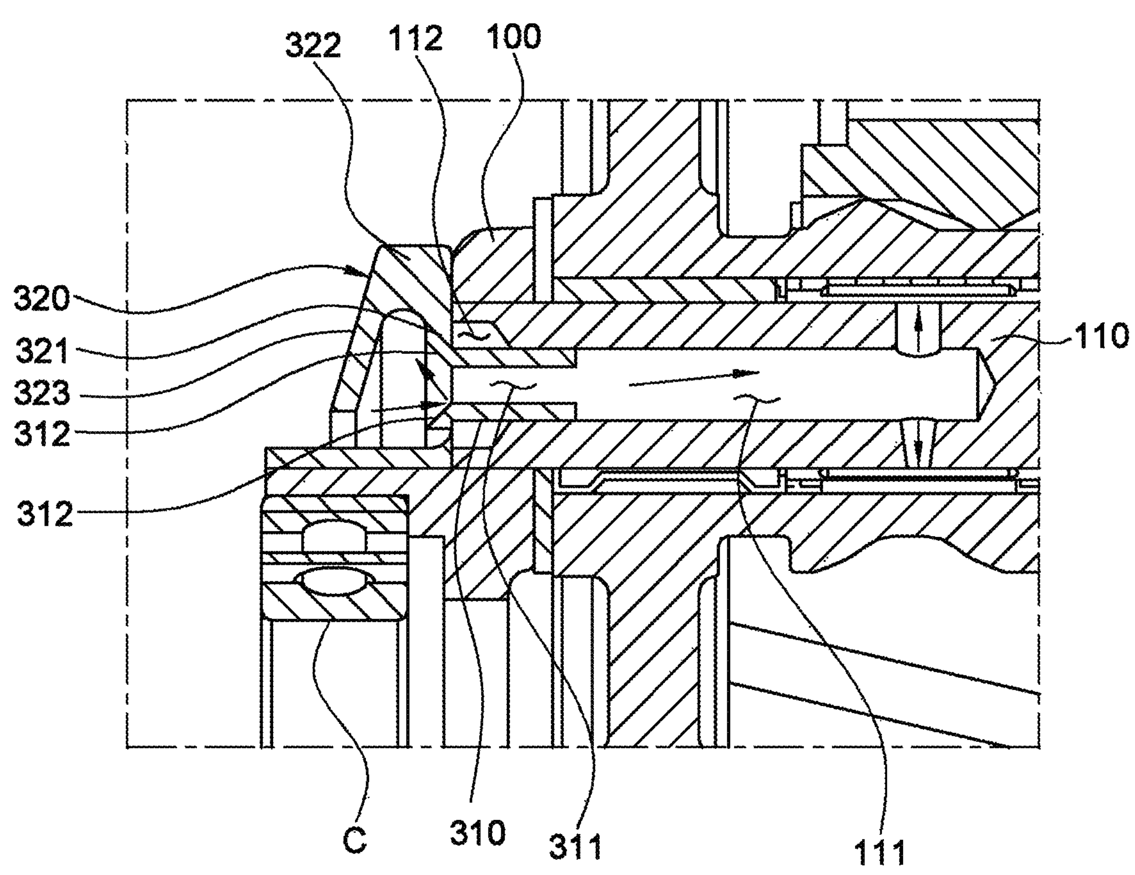
FIG. 5 is a partial cross-sectional view illustrating a coupling relationship between the oil guide and a coupling part of the present disclosure.

In this case, as illustrated in FIG. 5, the oil guide 300 may be coupled to one surface of the carrier 100 and coupled at a position corresponding to the forced lubrication reduction flow path 220. Accordingly, the lubricant may be smoothly received from the forced lubrication reduction flow path 220. A distance between the fixed part 310 and the center of the motor may be the same as a distance between the forced lubrication reduction flow path 220 and the center of the motor within a predetermined error range.

In addition, as illustrated in FIG. 5, the carrier 100 may be coupled to a pin 110 in which an oil storage flow path 111 in which lubricant is stored is formed to extend in an axial direction of the motor. The oil guide 300 may have the fixed part 310 inserted into the oil storage flow path 111 of the pin 110. Accordingly, the lubricant collected through the oil guide 300 may be stored in the oil storage flow path 111 of the pin 110. The oil storage flow path 111 may have a groove shape in which one end coming into contact with one surface of the carrier 100 is open and the other end is closed. Accordingly, the lubricant received from the forced lubrication reduction flow path 220 through the oil guide 300 can be easily received and stored therein. In addition, the oil storage flow path 111 may further have an open groove 112 that has a larger flow cross-sectional area than the oil storage flow path 111 and is formed at one end thereof. The open groove 112 may serve as a funnel and more smoothly receive the lubricant from the forced lubrication reduction flow path 220 through the large open area. At least a part of the open groove 112 may be closed by the oil collection part 320 of the oil guide 300.

In this case, the oil guide 300 and the pin 110 may be manufactured and formed separately from the carrier 100 and then coupled to the carrier 100 later. Accordingly, the lubricant supply system 1000 of the present disclosure can be easily applied even without additionally processing the carrier 100. For example, the oil guide 300 and the pin 110 may be formed of the same material and formed integrally with each other. Accordingly, it is possible to increase the convenience of assembling the lubricant oil supply system 1000 of the present disclosure.

Figure 6:
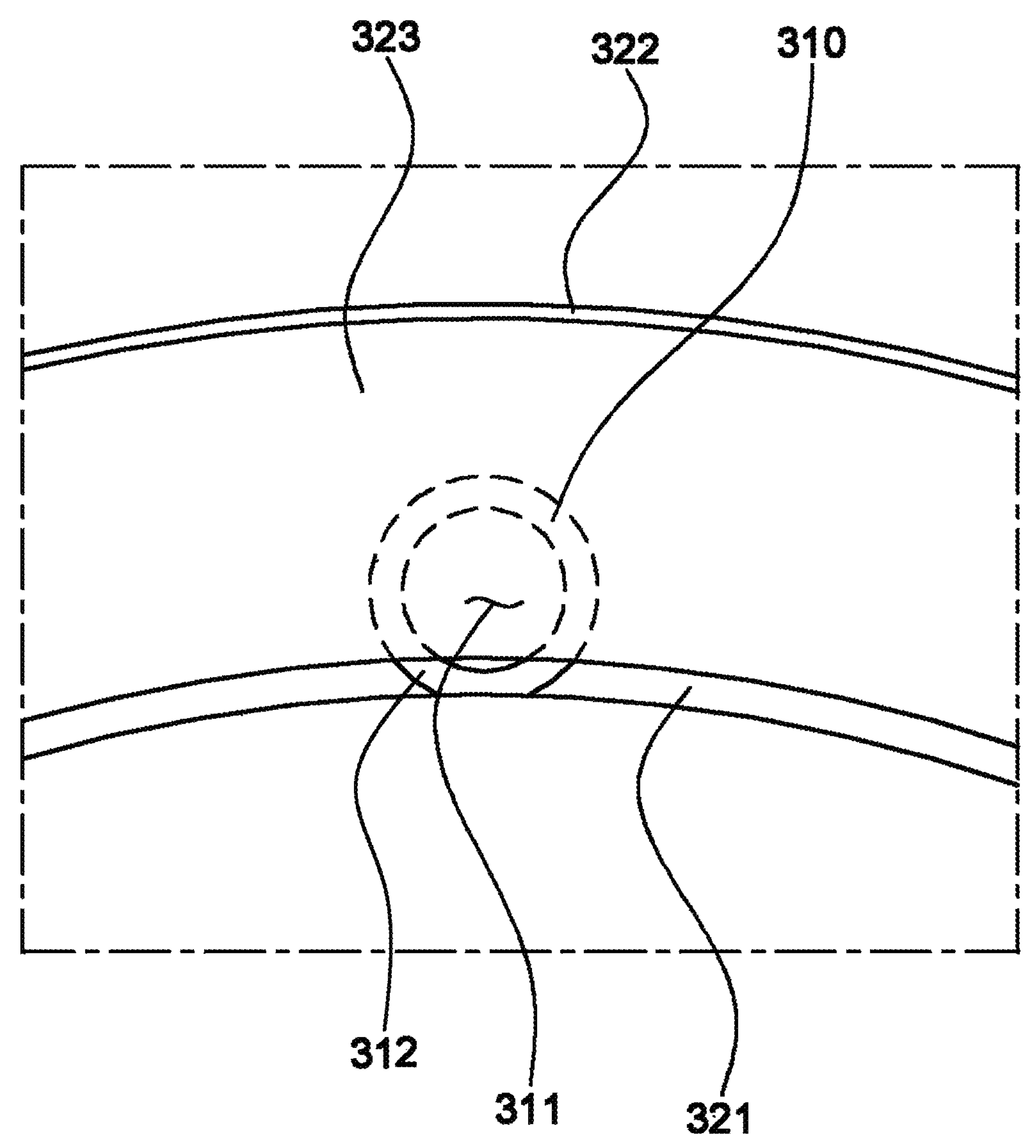
FIG. 6 is a partial plan view illustrating the oil guide of the present disclosure.

In addition, as illustrated in FIG. 6, the oil collection part 320 preferably includes a first extension 321 that has one end connected to an end of the fixed part 310 and is formed to extend in the radial direction of the motor to come into contact with the one surface of the carrier 100, a second extension 322 formed to extend from the first extension 321 in the axial direction of the motor, and a third extension 323 that is formed to extend from the second extension 322 and formed to extend so that an end is positioned in a region in which the guide flow path 311 is formed. Accordingly, oil may be collected and stored in a space surrounded by the first extension 321, the second extension 322, and the third extension 323.

In this case, the guide flow path 311 may include an inclined surface 312, which is not parallel to the axial direction and radial direction of the motor, at an end portion of the oil collection part 320 side. By including the inclined surface 312, it is possible to prevent a small amount of lubricant from remaining at an end portion of the guide flow path 311 when not lubricated. In addition, lubricant may be sprayed onto the inclined surface 312 of the guide flow path 311 that is not covered by the third extension 323, the lubricant may be reflected from the inclined surface 312, and the lubricant may be transferred to the oil storage flow path 111 inside the oil collection part 320 or the pin 110. In addition, when the lubricant stored in the oil collection part 320 is transferred to the guide flow path 311 and the oil storage flow path 111, even when the first extension 321 and the guide flow path 311 are formed in a direction perpendicular to each other, the lubricant may be transferred without loss through the inclined surface 312 because the inclined surface 312 is included in the middle.

Figure 7:
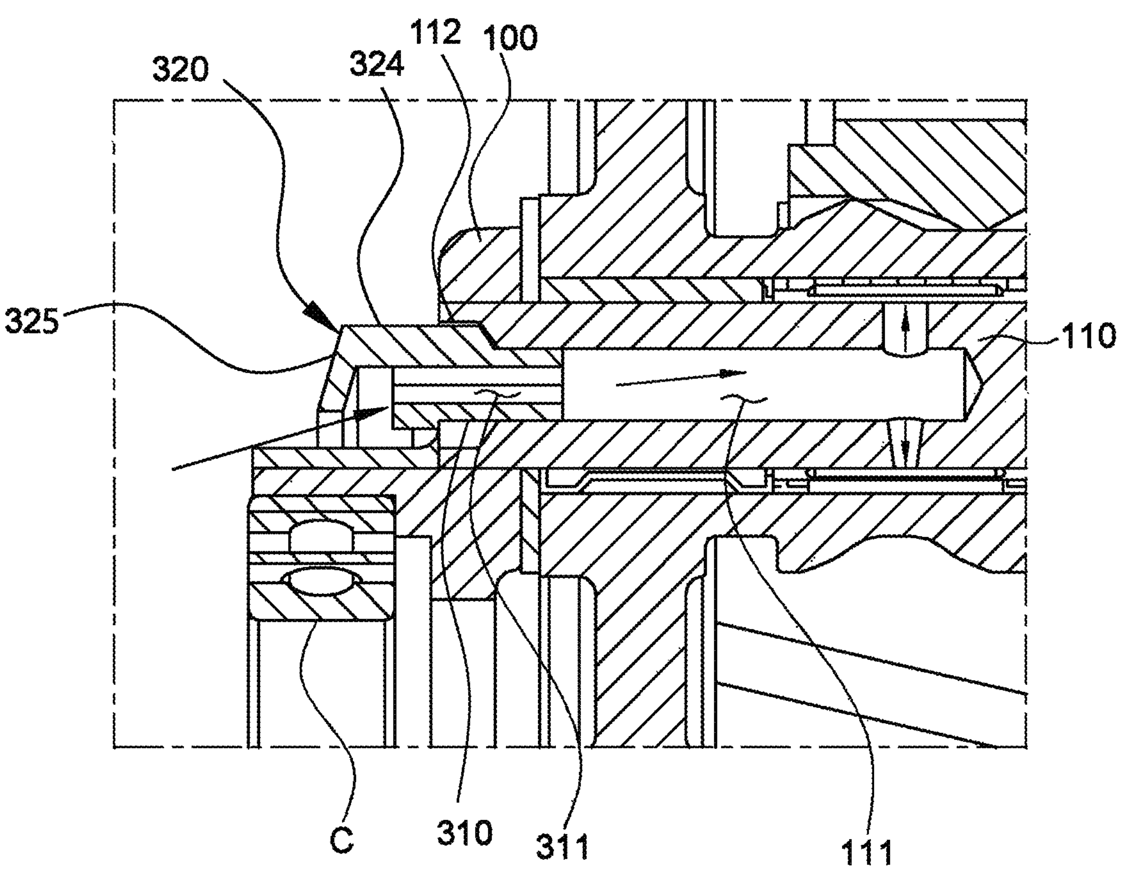
FIG. 7 is a partial plan view illustrating one embodiment of the oil guide of the present disclosure.

Alternatively, in one embodiment of the oil collection part 320, as illustrated in FIG. 7, the oil collection part 320 preferably includes a fourth extension 324 that has one end connected to the end of the fixed part 310 and formed to extend flatly in the radial direction of the motor to come into contact with one surface of the carrier 100, and a fifth extension 325 formed to extend from the fourth extension 324 and formed to extend so that an end is positioned in a region in which the guide flow path 311 is formed. Unlike the rotor plate/oil spreader of the rotor, since the reducer has an oil spray target point included in the carrier and rotates together, when oil is sprayed, the fifth extension 325 of the oil collection part 320 may catch oil spread by a centrifugal force. In addition, even when the pin, which is the oil spray target point, comes into contact with an inner surface of the fourth extension 344 of the oil collection part 320, oil may be evenly supplied to three needle pins. In this case, the oil collection part 320 may be fixedly caught on the open groove 112.

In addition, the third extension 323 or the fifth extension 325 may be formed to extend obliquely so as not to be parallel to the axial direction and radial direction of the motor. Accordingly, it is possible to increase the time that lubricant remains on a wall surface of the third extension 323 or the fifth extension 325 and allow the oil collection part 320 to store the lubricant more smoothly.

According to the lubricant supply system of the present disclosure according to the above configuration, by including the carrier that fixes the carrier bearing adjacent to the needle bearing to the motor housing, securing the flow path along which lubricant is supplied to one surface of the carrier, and including the oil guide that stores the supplied lubricant during high-speed rotation and supplies the lubricant to other parts during low-speed rotation, it is possible to minimize forced lubrication compared to conventional lubricant supply systems and smoothly supply oil to the needle bearing and the carrier bearing even during high-speed rotation using a centrifugal force and wind power generated naturally from the on-axis rotors.

The technical spirit of the present disclosure should not be construed as limited to the above-described embodiments. Not only the scope of applications is diverse, but also various modifications may be made by those skilled in the art without departing from the gist of the present disclosure as claimed in the claims. Therefore, these improvements and changes fall within the scope of the present disclosure as long as they are obvious to those skilled in the art.

What is claimed is:

1. A lubricant supply system mounted on a motor, comprising:

a carrier which has an insertion hole formed at a central portion thereof and in which a carrier bearing, which is one of parts of the motor, is inserted into the insertion hole;

an oil flow path inserted into a housing of the motor; and an oil guide that is coupled to the carrier and guides a flow of lubricant, wherein the carrier has one surface facing the housing, and the oil flow path has an outlet disposed to face the one surface of the carrier so that lubricant is sprayed onto the oil guide coupled to the carrier.

2. The lubricant supply system of claim 1, wherein the oil flow path includes:

a main flow path connected to a pump that supplies lubricant and formed to extend in a radial direction of the motor; and a forced lubrication reduction flow path formed to extend from the main flow path toward the one surface of the carrier.

3. The lubricant supply system of claim 2, wherein the oil guide is coupled to the one surface of the carrier, and is coupled at a position at which lubricant is received from the forced lubricant reduction flow path.

4. The lubricant supply system of claim 1, wherein the oil guide includes:

a fixed part which is inserted into and coupled to the carrier and in which a hole-in guide flow path along which lubricant flows is perforated at a central portion thereof; and an oil collection part that is formed to extend from the fixed part and collects lubricant when the motor rotates.

5. The lubricant supply system of claim 4, wherein the guide flow path includes an inclined surface, which is not parallel to an axial direction and a radial direction of the motor, at an end portion of the oil collection part side.

6. The lubricant supply system of claim 4, wherein the carrier is coupled to a pin in which an oil storage flow path in which lubricant is stored is formed to extend in an axial direction of the motor, and the fixed part is inserted into the oil storage flow path of the pin.

7. The lubricant supply system of claim 6, wherein the oil guide is formed integrally with the pin.

8. The lubricant supply system of claim 6, wherein the pin includes an open groove that is open with a larger cross-sectional area than the oil storage flow path, is formed at one end to which the oil guide is coupled, and communicates with the oil storage flow path.

9. The lubricant supply system of claim 4, wherein the oil collection part includes:

a first extension that has one end connected to an end of the fixed part and formed to extend in a radial direction of the motor to come into contact with the one surface of the carrier;

a second extension formed to extend from the first extension in the axial direction of the motor; and a third extension formed to extend from the second extension and formed to extend so that an end is positioned in a region in which the guide flow path is formed.

10. The lubricant supply system of claim 9, wherein the third extension is formed to extend obliquely so as not to be parallel to the axial direction and radial direction of the motor.

11. The lubricant supply system of claim 4, wherein the oil collection part includes:

a fourth extension that has one end connected to an end of the fixed part and formed to extend flatly in a radial direction of the motor to come into contact with the one surface of the carrier; and a fifth extension formed to extend from the fourth extension and formed to extend so that an end is positioned in a region in which the guide flow path is formed.

12. The lubricant supply system of claim 11, wherein the fifth extension is formed to extend obliquely so as not to be parallel to the axial direction and radial direction of the motor.

* * * * *